(12) United States Patent
Jarry et al.

(10) Patent No.: US 6,353,181 B1
(45) Date of Patent: Mar. 5, 2002

(54) APPARATUS BOX TO BE ARRANGED ALONG A WIREWAY, IN PARTICULAR FOR ELECTRICAL APPARATUS

(75) Inventors: Patrice Jarry, Mont Saint Jean; Michel Pallier, Limoges; Patrick Bernardeau, Chaptelat, all of (FR)

(73) Assignees: Legrand; Legrand SNC, both of Limoges (FR)

( * ) Notice: Subject to any disclaimer, the term of this patent is extended or adjusted under 35 U.S.C. 154(b) by 0 days.

(21) Appl. No.: 09/674,358

(22) PCT Filed: Nov. 25, 1999

(86) PCT No.: PCT/FR99/02916

§ 371 Date: Dec. 11, 2000

§ 102(e) Date: Dec. 11, 2000

(87) PCT Pub. No.: WO00/33435

PCT Pub. Date: Jun. 8, 2000

(30) Foreign Application Priority Data

Nov. 27, 1998 (FR) .............................. 98 14942

(51) Int. Cl.$^7$ ................................ H02G 3/04
(52) U.S. Cl. .............................. 174/48; 174/49; 174/50; 220/3.2; 220/3.3

(58) Field of Search .............................. 174/48, 49, 50, 174/68.1, 68.3, 60, 67, 95, 99 R, 50.54; 220/3.2, 3.3, 4.02, 4.01; 52/220.1, 220.3, 220.5, 220.7

(56) References Cited

U.S. PATENT DOCUMENTS

| 2,987,690 A | * | 6/1961 | Marbais ........................ 174/48 |
| 3,721,762 A | * | 3/1973 | Gooding ....................... 174/48 |
| 5,277,007 A | * | 1/1994 | Hellwig et al. ................ 174/67 |
| 5,300,731 A | * | 4/1994 | DeBaratolo, Jr. et al. ..... 174/48 |
| 5,629,496 A | * | 5/1997 | Navazo ........................ 174/48 |
| 5,998,732 A | * | 12/1999 | Caveney et al. .............. 174/48 |

FOREIGN PATENT DOCUMENTS

| FR | 2 595 513 | 9/1987 |
| FR | 0 633 639 A1 | 1/1995 |

* cited by examiner

Primary Examiner—Dean A. Reichard
Assistant Examiner—Angel R. Estrada
(74) Attorney, Agent, or Firm—Young & Thompson

(57) ABSTRACT

A box includes a body adapted to be directly mounted on the wall and which has an opening, and a canopy which, extending from the body, corresponding to the opening thereof, is designed to cover locally the wireway, transversely thereto. The canopy is formed by at least two separate telescoping parts, spaced out longitudinally over the wireway.

17 Claims, 2 Drawing Sheets

APPARATUS BOX TO BE ARRANGED ALONG A WIREWAY, IN PARTICULAR FOR ELECTRICAL APPARATUS

BACKGROUND OF THE INVENTION

The present invention relates generally to installing devices, in particular electrical devices, alongside trunking projecting from a wall and housing and projecting conductors or other lines connected to such devices.

Here, and in the usual way, the term "trunking" refers to a duct comprising a base section which is attached to the wall concerned and has an open cross section and a cover section which is attached to the base section, for example clipped to it, to close it.

The present invention is aimed more particularly at the situation in which a device is installed alongside trunking by means of a box including, on the one hand, a body which is attached to the wall, houses the device and has an opening along its side adjoining the trunking, and, on the other hand, a canopy which extends from the body, is in corresponding relationship to the opening therein, and is designed to cover the trunking locally, transversely to its length, to be more precise to extend in practice over the base section of the trunking, between two lengths of cover section.

One problem to be overcome when manufacturing a box of the above kind is that trunking is available with different widths or heights.

French patent No. 2 595 513, filed as application number 86 03334 on Mar. 10, 1986, proposes to overcome this difficulty by separating the canopy from the body and engaging it in the body to a greater or lesser extent, according to the width or height of the trunking.

However, to prevent any surplus length of the canopy inside the body from interfering with other components present therein, it is necessary to cut off the excess length, which entails cutting the canopy beforehand, which complicates installation.

In published European patent No. 0 633 639, the canopy is removable from the body, so that a canopy suitable for one trunking width or height can be replaced by another canopy suitable for a different trunking width or height.

However, this leads to costly manufacture of a multiplicity of canopies, which is detrimental from the cost point of view.

SUMMARY OF THE INVENTION

A general object of the present invention is to avoid the above drawbacks.

To be more precise, the present invention provides a box for a device to be disposed alongside trunking projecting from a wall, of the kind including, on the one hand, a body which is adapted to be attached to the wall and to accommodate the device concerned and has an opening along its side at which it adjoins the trunking and, on the other hand, a transverse canopy extending from the body, in corresponding relationship to the opening therein, and adapted to cover the trunking locally, characterized in that the canopy is formed of at least two separate parts which are staggered lengthwise over the width or height of the trunking, namely, starting from the body, a fixed part which is fastened to the body and at least one mobile part which is inter-engaged with the fixed part and adjustable in position relative to it.

Accordingly, it is sufficient to adjust the position of the mobile part of the canopy relative to its fixed part to adapt the length of the canopy to the width or height of the trunking to be covered.

This being the case, any surplus length of the mobile part of the canopy is advantageously absorbed by its fixed part, rather than projecting into the body, and therefore without interfering in any way with other components present therein.

The mobile part of the canopy preferably occupies one or other of two particular positions relative to its fixed part, those positions being chosen to correspond to the most usual trunking widths or heights likely to be encountered.

This advantageously avoids any fumbling when locating the fixed and mobile parts of the canopy relative to each other.

What is more, this has the advantage that they are neatly located, which has esthetic benefits.

To materialize the various positions of the mobile part, means are preferably provided for positively locating the fixed and mobile parts of the canopy.

The locating means are advantageously nesting means, which is beneficial from the point of view of retaining the mobile part of the canopy relative to its fixed part.

BRIEF DESCRIPTION OF THE DRAWINGS

The features and advantages of the invention will emerge further from the following description, which is given by way of example and with reference to the accompanying diagrammatic drawings, in which.

DESCRIPTION OF THE PREFERRED EMBODIMENTS

As shown in the figures, and in a manner that is known in the art, the overall aim is to use a box 11 to install a device, not shown, alongside trunking 10 projecting from a wall, also not shown.

Figures 1, 2:
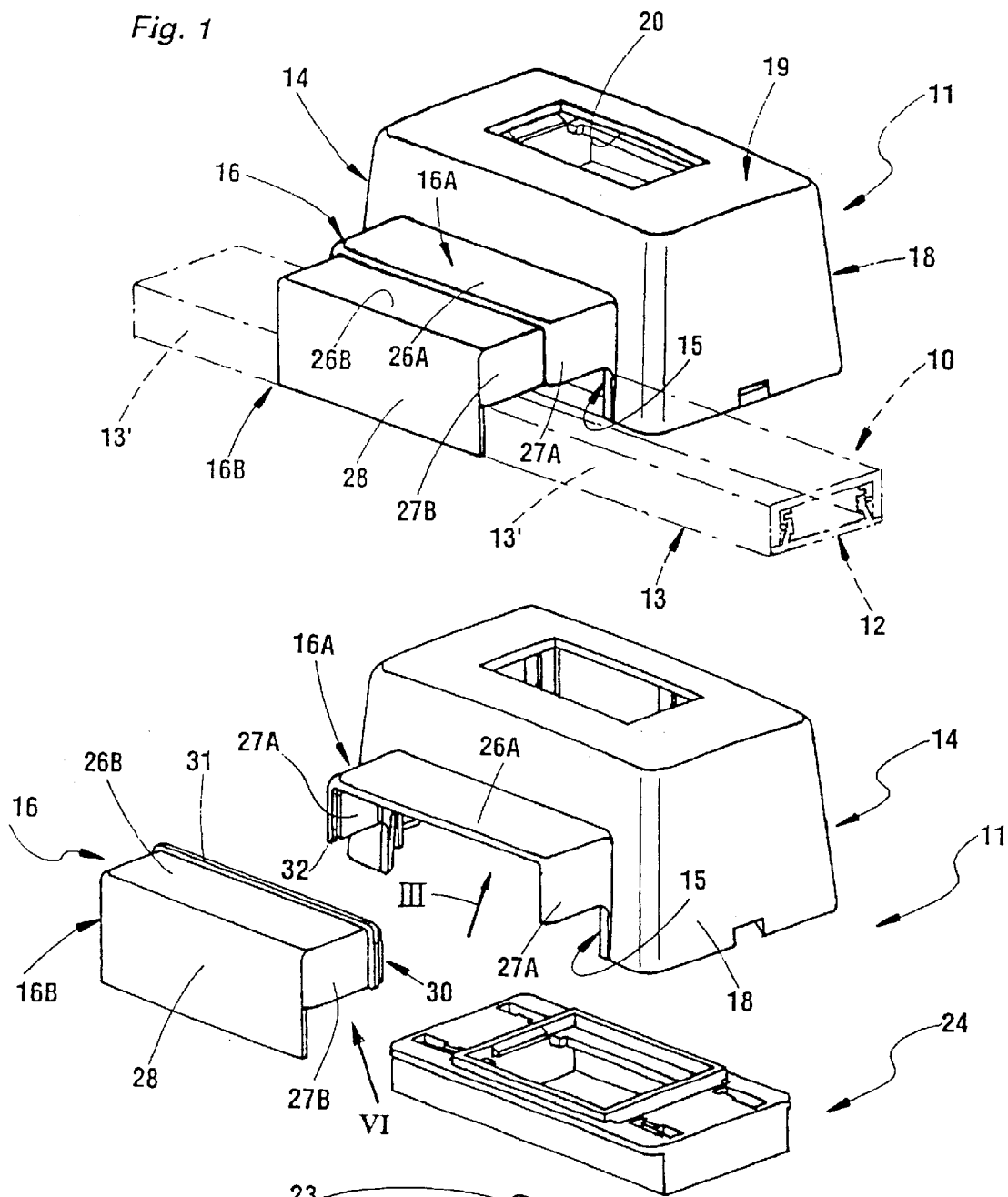
FIG. 1 is a perspective view of a box according to the invention.
FIG. 2 is an exploded perspective view of the box.

Although it is not in itself relevant to the present invention, the trunking 10 is shown diagrammatically in dashed outline in FIG. 1.

In the embodiment shown, and in a manner that is known in the art, it includes a base section 12 which is attached to the wall and has an open cross section and a cover section 13 which is attached to the base section 12, for example clipped to it, to close it.

The box 11 is located between two lengths 13' of the cover section 13.

In a manner that is known in the art, it includes a body 14 which is attached to the wall alongside the trunking 10 to accommodate the device concerned, more particularly the mechanism of that device, and which has an opening 15 along the side adjoining the trunking 10. A canopy 16 extends from the body 14, in corresponding relationship to the opening 15 therein (in practice in corresponding relationship to only the upper part of the opening 15), to cover the trunking 10 locally. The canopy extends transversely to the trunking 10, in practice extending over the base section 12 between the two lengths 13' of the cover section 13.

The body 14 of the box 11 has a lateral wall 18 and a front wall 19.

In the embodiment shown, the lateral wall 18 is the shape of a truncated pyramid, for example, and the front wall 19 has an opening 20 in its central area through which a portion of the device concerned that is accessible to the user passes.

As shown here, for example, the lateral wall 18 and the front wall 19 are in one piece, forming a single generally bell-shaped component.

They can instead be parts of separate components, however.

The corresponding arrangements are well known in the art in themselves and are not relevant to the present invention. For this reason they are not described here.

In the embodiment shown, and in a manner that is not relevant to the present invention either, and therefore not further described here, the box 11 is completed by a plate 22 for attaching it and its contents to the wall and which incorporates four projecting columns 23 and by a device support 24 which is designed to receive the mechanism of the device concerned and adapted to be clipped onto the columns 23 on the plate 22, the resulting assembly being capped and covered by the body 14.

In accordance with the invention, the canopy 16 has at least two separate parts 16A, 16B which are staggered in the lengthwise direction across the width or height of the trunking 10, namely, starting from the body 14, a fixed part 16A which is fastened to the body 14 and at least one mobile part 16B which is inter-engaged with the fixed part 16A and adjustable in position relative to it.

In practice, the canopy 16 has only one mobile part 16B in the embodiment shown.

Figure 3:
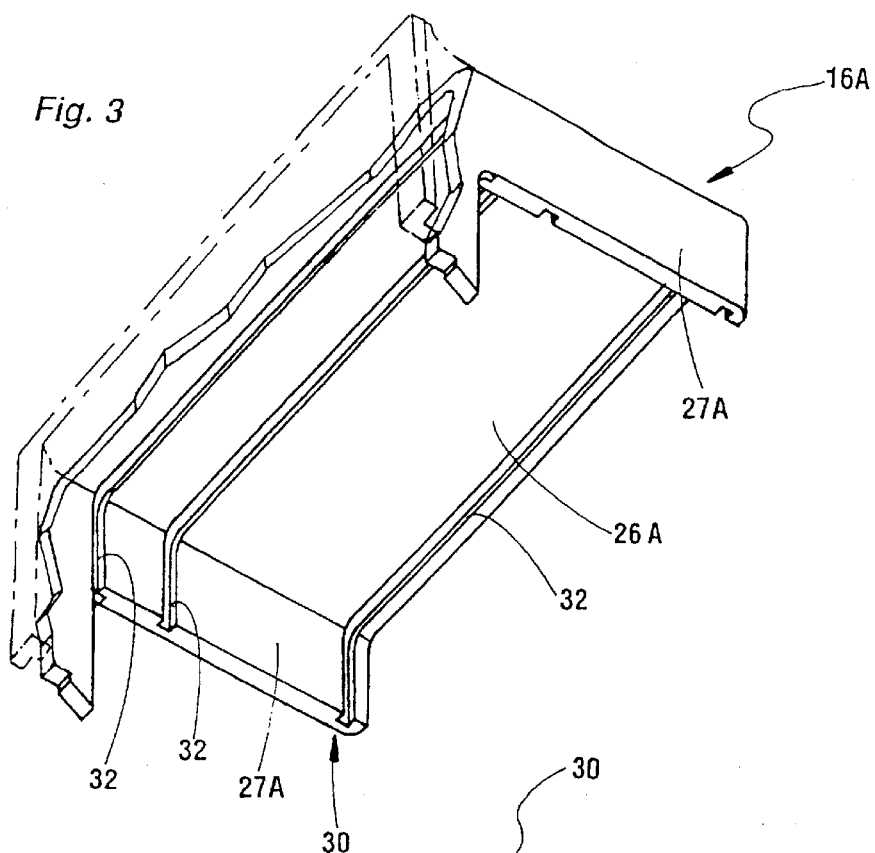
FIG. 3 is a perspective view to a larger scale of The fixed part of the canopy of the box, seen from below, in the direction of the arrow III in FIG. 2, and FIG. 4, which corresponds to FIG. 3 and is to the same scale as FIG. 3, is a perspective view of the mobile part of the canopy, seen from below, in the direction of the arrow IV in FIG. 2.

In the embodiment shown in continuous outline in FIGS. 1 and 2 and shown diagrammatically in dashed outline in FIG. 3, which is the preferred embodiment of the invention, the fixed part 16A of the canopy 16 is separate from the body 14 of the box 11 and attached to the body 14.

For example, the fixed part 16A of the canopy 16 is removable so that the canopy 16 can, if required, be replaced with a blanking plate for blanking off the opening 15 in the body 14.

The corresponding arrangements are well known in the art in themselves and are not relevant to the present invention. For this reason they are not described here.

Alternatively, the fixed part 16A of the canopy 16 can be in one piece with the body 14, if required, forming a single component with at least the portion thereof in which the opening 15 is formed, in this instance its lateral wall 18.

In either case, the fixed part 16A of the canopy 16 has a front wall 26A and two lateral walls 27A in the embodiments shown.

The front part 26A is in line with the top part of the opening 15 in the body 14 and the lateral walls 27A extend over only a fraction of the height of the opening 15, leaving a passage to the trunking 10 below them.

The total length of the fixed part 16A of the canopy 16, as measured from the body 14, is preferably chosen to correspond substantially to the minimum width or height of the trunking 10 likely to be encountered, being slightly less than that minimum width or height, allowing for the associated mobile part 16B.

In the embodiments shown, the mobile part 16B of the canopy 16 is engaged in its fixed part 16A.

Like the latter, it has a front wall 26B and two lateral walls 27B, but it is completed by a front wall 28 which is extended beyond the lateral walls 27B to cover the base section 12 of the trunking 10 laterally.

The front wall 26B of the mobile part 16B of the canopy 16 engages under the front wall 26A of the fixed part 16A and is substantially in contact with it and its lateral walls 27B engage between the lateral walls 27A of the fixed part 16A and are substantially in contact with them.

In the embodiments shown, the mobile part 16B of the canopy 16 can occupy any of a number of clearly defined positions relative to its fixed part 16A.

To this end, and as is the case in these embodiments, locating means 30 are preferably provided for the fixed part 16A and the mobile part 16B of the canopy 16.

As shown here, for example, the locating means 30 take the form of nesting means.

To be more precise, in the embodiments shown, the locating means 30 include at least one transverse rib 31 projecting from either part 16A or 16B of the canopy 16 and at least one transverse groove 32 in the other of the parts 16A and 16B and whose profile in cross section is at least partly complementary to that of the previously mentioned rib 31.

In the embodiments shown, the rib 31 is part of the mobile part 16B of the canopy 16 and extends over at least a portion of its transverse profile and the groove 32 is part of the fixed part 16A of the canopy 16 and extends over at least a portion of its transverse profile in corresponding relationship to the rib 31 on the mobile parts 16B.

In practice, the rib 31 projects from the outside surface of the mobile part 16B of the canopy 16 and the groove 32 is in the inside surface of its fixed part 16A.

In the embodiments shown, the rib 31 extends over the whole of the transverse profile of the mobile part 16B of the canopy 16, continuously with its front wall 26B, and over all of its width, and with its lateral walls 27B, and over all of their height, and the groove 32 extends over the whole of the transverse profile of the fixed part 16A of the canopy 16, continuously with its front wall 26A, and over the whole of the width thereof, and with its lateral walls 27A, and over the whole of their height.

In practice, the rib 31 is in the vicinity of the free edge of the mobile part 16B of the canopy 16 and the fixed part 16A of the canopy 16 includes a plurality of spaced staggered grooves 32 along its length.

Finally, in the embodiments shown, the rib 31 on the mobile part 16B of the canopy 16 and the groove 32 on the fixed part 16A of the canopy 16 each have a rectangular profile in cross section.

Figure 4:
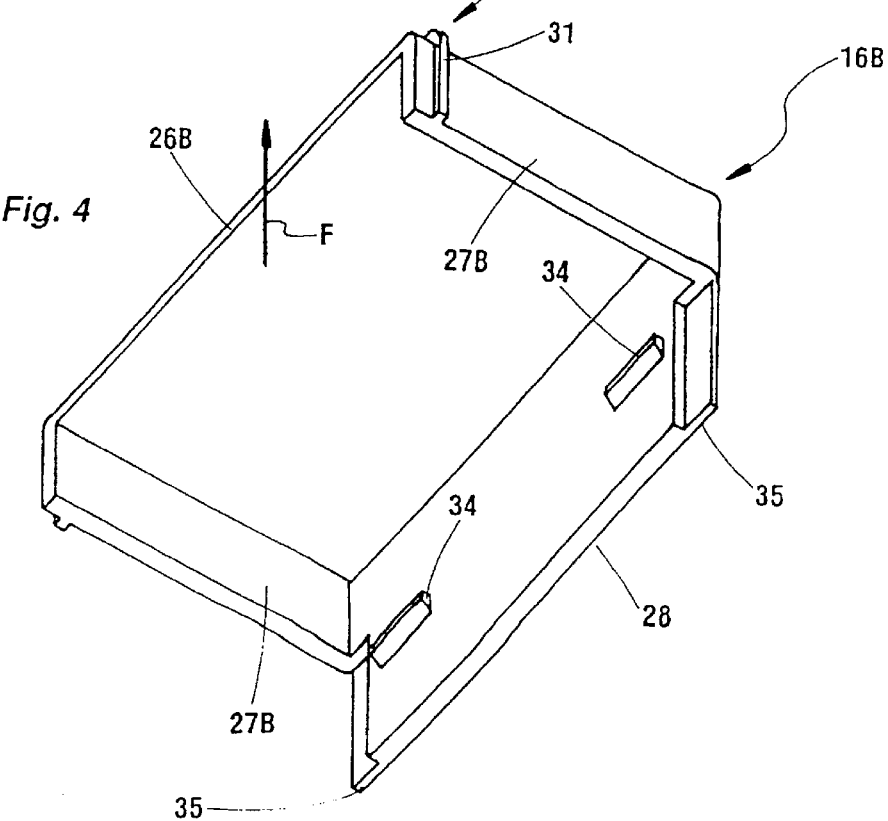

Also, in the embodiments shown, and as can be seen in FIG. 4, the mobile part 16B of the canopy 16 has internal ribs 34 projecting from its front wall 28 for clipping it onto the base section 12 of the trunking 10.

It further includes thinner portions 35 which extend from its lateral walls 27B in the corner area of the front wall 28, for reasons that will become apparent hereinafter.

At assembly time, the rib 31 on the mobile part 16B of the canopy 16 is nested in one or other of the grooves 32 on the fixed part 16A of the canopy 16, by means of a movement in translation substantially perpendicular to its front wall 26B, as shown by the arrow F in FIG. 4.

Of course, the groove 32 on the fixed part 16A in which it nests is chosen to suit the width or height of the trunking 10 to be covered.

As shown diagrammatically in FIG. 1, the front wall 28 of the mobile part 16B of the canopy 16 is then pressed substantially laterally against the base section 12 of the trunking 10, continuously with the length 13' of its cover section 13, and its thinner portion 35 covers the latter.

Of course, the present invention is not limited to the embodiments described and shown, and encompasses any variant execution thereof.

In particular, the number of parts of the canopy can be greater than two and the ribs and grooves can be interchanged between the parts.

Retaining the mobile part(s) of the canopy by means of a simple telescopic assembly of the various parts of the canopy is also within the scope of the invention.

What is claimed is:

1. A box for a device to be disposed alongside a trunking projecting from a wall, the box including a body that is adapted to be attached to the wall and that has an opening along its side at which it adjoins the trunking, and a transverse canopy extending from the body in corresponding relationship to the opening therein and being adapted to cover the trunking locally, said canopy comprising a fixed part fastened to the body and a mobile part mounted for movement relative to the fixed part, one of said fixed and mobile parts comprising at least one first nest and the other of said fixed and mobile parts comprising at least two second nests complementary to said first nest, one of said at least two second nests cooperating with the first nest to position said mobile part at a first position relative to said fixed part and adapting the canopy to a first trunking size and the other of said at least two second nests cooperating with the first nest to position said mobile part in a second position relative to said fixed part and adapting the canopy to a second trunking size.

2. The box according to claim 1, wherein the first nest includes one transverse rib which projects from one of the parts of the of the canopy and each of the second nests includes one transverse groove on another one of the parts of the canopy and whose transverse profile is at least partly complementary to that of the rib.

3. The box according to claim 2, wherein the rib is on the mobile part and extends over at least a portion of the transverse profile thereof and the groove is in the fixed part and extends over at least a portion of the transverse profile thereof and in corresponding relationship to the rib on the mobile part.

4. The box according to claim 3, wherein the rib extends over the whole transverse profile of the mobile part and the groove extends over the whole transverse profile of the fixed part.

5. The box according to claim 3, wherein the rib is in the vicinity of a free edge of the mobile part.

6. The box according to claim 3, wherein the fixed part includes a plurality of the grooves staggered along its length.

7. The box according to claim 1, wherein the mobile part is engaged in the fixed part.

8. The box according to claim 3, wherein the rib projects from an outside surface of the mobile part and the groove is recessed into an inside surface of its fixed part.

9. The box according to claim 1, wherein the fixed part is in one piece with the body and forms a single component with at least a portion thereof in which the opening is formed.

10. The box according to claim 1, wherein the fixed part forms a part separate from the body and is adapted to be attached to the body.

11. The box according to claim 10, wherein the fixed part is removable.

12. The box according to claim 1, wherein the canopy has only one mobile part.

13. A box to be placed next to a trunking, the box comprising:

a hollow body with an opening at a side of said hollow body that is to be placed next to the trunking; and a canopy projecting a selectable distance from said hollow body over said opening, said canopy comprising a fixed part and a movable part, said fixed part being attached to and projecting from said hollow body a fixed distance, said movable part being retractably movable inside said fixed part into any of plural nesting positions so as to select a distance said movable part projects from said fixed part, one of said fixed and movable parts having a first attachment and the other of said fixed and movable parts having plural second attachments that each correspond to said first attachment and that define the plural nesting positions.

14. The box of claim 13, wherein said first attachment is one of a projection and a groove, and the second attachment is the other of the projection and the groove.

15. The box of claim 13, wherein said plural second attachments are in said fixed part.

16. The box of claim 15, wherein each of said second attachments is a groove.

17. A box for a device to be disposed alongside a trunking projecting from a wall, the box including a body which is adapted to be attached to the wall and to accommodate the device, an opening along its side at which it adjoins the trunking, and a transverse canopy extending from the body in corresponding relationship to the opening and adapted to cover the trunking locally, wherein the canopy is formed of at least two separate parts which are staggered lengthwise over a width or height of the trunking, namely, a fixed part which is fastened to the body and at least one mobile part which is inter-engaged with the fixed part and adjustable in position relative to it, at least one transverse rib projecting from the mobile part, wherein the fixed part of the canopy includes a plurality of spaced grooves staggered along its length, the grooves being at least partly complementary to said rib.

* * * * *